Dec. 21, 1954    J. GORDON    2,697,773
DIELECTRIC HEATING CONVEYER APPARATUS
Filed Aug. 16, 1951
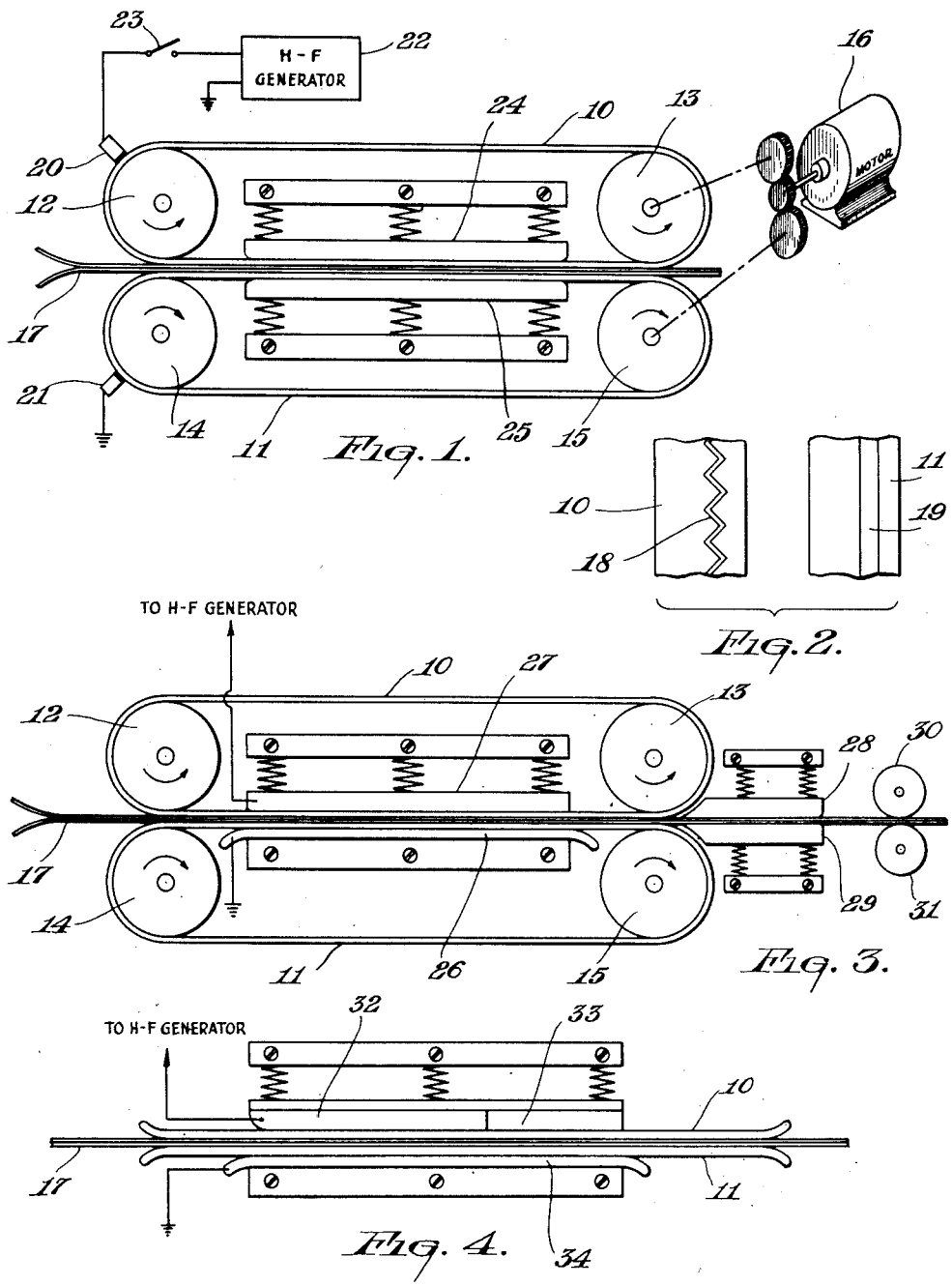
INVENTOR.
JACOB GORDON
BY
AGENT.

United States Patent Office 2,697,773
Patented Dec. 21, 1954

2,697,773

DIELECTRIC HEATING CONVEYER APPARATUS

Jacob Gordon, Brooklyn, N. Y., assignor to Bert H. Wallace, Kew Gardens, Long Island, N. Y.

Application August 16, 1951, Serial No. 242,096

4 Claims. (Cl. 219—10.69)

The present invention relates generally to apparatus for impressing a high-frequency electrostatic field on insulating or dielectric materials to form a seal therein and, more particularly, to apparatus adapted, on the basis of continuous motion, to effect dielectric heating of two or more superposed layers of such material to develop a seal therein exhibiting any desired shape or pattern.

In fabricating plastic articles by the high-frequency dielectric heating technique, a major factor in determining the difficulty and time involved in forming the desired seals is that upon subjecting the article to the electrostatic field, it must thereafter be permitted to cool under pressure to allow solidification of the seal. Thus in the formation of seals of extended length it has heretofore been the practice to compress one section of the article between stationary electrodes connected to a high-frequency generator for a predetermined heating period and to thereupon disconnect the high-frequency energy, thereby allowing the seal to cool under the electrode pressure. After a suitable cooling period another section was brought between the electrodes and the sealing cycle was repeated. In consequence of the alternate heating and cooling of successive sections of the material, the sealing operation was intermittent in nature and time consuming.

The principal object of the present invention is to provide dielectric heating apparatus adapted to effect a continuous sealing operation wherein heating and cooling of the material is accomplished without interruption, thereby substantially reducing the time required for fabrication of the article.

It is a more specific object of the invention to effect heat sealing of dielectric materials in any desired shape or pattern on the basis of continuous motion.

Another object of the invention is to impart, on the basis of continuous motion, a tear seal or an embossed pattern to the material.

Yet another object of the invention is to provide improved electrode structures adapted to impress a high-frequency electrostatic field on the material being sealed, and at the same time to compress the material.

Briefly stated, the objects of the invention are attained in an apparatus constructed and arranged to apply heat and pressure by means of a pair of spaced movable endless belts between which the dielectric sheets are inserted, the belts conveying the sheets. Provision is made for applying an electrostatic field across the sheets as they pass through the belt conveyer, the sheets being maintained under mechanical pressure. The belts may be designed to carry flexible electrodes imparting a heat seal of any desired pattern, or stationary electrodes may be provided which are constructed to apply both pressure and an electrical field to the sheets as they travel through the belts. Further provision is made to allow for cooling of the sheets as they travel through the belts, without interruption of travel.

For a better understanding of the invention as well as other and further objects thereof, reference is made to the following detailed description thereof, to be read in conjunction with the accompanying drawing, wherein like elements are identified by like reference numerals.

In the drawing:

Fig. 1 is a schematic diagram of one preferred embodiment of a dielectric heating apparatus in accordance with the invention;

Fig. 2 shown, in separate detail, portions of the belts included in the apparatus illustrated in Fig. 1;

Fig. 3 is a schematic diagram of a second preferred embodiment of the invention; and Fig. 4 is a schematic diagram of an electrode structure in accordance with the invention.

Referring now to Fig. 1, there is disclosed an apparatus for imparting a zig-zag seal to a multi-layer article, the apparatus comprising two flexible endless belts 10 and 11 arranged in parallel relation to form a conveyer, belt 10 being mounted on spaced pulley members 12 and 13, and belt 11 being similarly mounted on pulley members 14 and 15. A driving mechanism 16 is provided to rotate the pulleys 12 and 13 in one direction and pulleys 14 and 15 in the reverse direction, thereby causing the adjacent portions of the belts to travel in a common direction.

The correspondingly positioned pulleys 13 and 15 and the pulleys 12 and 14 are preferably so mounted and spring biased as to urge the pulleys into coacting pressure relationship, whereby the belts are urged into plane-to-plane relationship. Thus when a multi-layer article, such as a plastic two-ply strip 17, is inserted between pulleys 12 and 14, it will be continuously drawn by the belts through the conveyer where it will be subjected both to pressure and heat treatment in a manner shortly to be described.

The belts 10 and 11, portions of which are separately illustrated in Fig. 2, are fabricated of a low-loss dielectric material such as rubber, and preferably of teflon (polytetrafluoroethylene) or silicone rubber (polysiloxane elastomer), which is substantially unaffected by a high-frequency field. In the embodiment illustrated in Fig. 1, belt 10 has affixed thereto a flexible band 18 of a high-conductivity metal, such as copper, the band being sinuously shaped in a zig-zag pattern to impart a seal of the same shape to the article. Obviously, the band may be formed in any other desired shape, the zig-zag shape being merely by way of example. The lower belt has attached thereto a metallic band 19 of linear form. Electrical contact is made with bands 18 and 19 by brushes 20 and 21, respectively, which are positioned to engage the bands on the pulleys. The brushes are connected to a suitable high-frequency generator 22 of any known design, through a switch 23, thereby creating an electrostatic field in the area between the two bands, the two bands in this instance serving as the electrodes of the system. As an alternative to direct electrical connection to the bands by means of brushes, a capacitive coupling may be effected by means of fixed plates disposed in proximity to the bands.

Thus as the plastic strip travels through the conveyer, there is transmitted by the band electrodes sufficient current to raise the temperature of the plastic to a point liquifying same. In the event it is also desired to impart a tear seal or an embossed seal to the article, raised bands may be used, so that as the article passes through the conveyer, the desired pattern is engraved therein as the article is heated.

To ensure adequate pressure, dielectric pressure elements 24 and 25 are provided in the form of wooden or Bakelite blocks, which are spring mounted, as shown, to urge the blocks against the belts in a direction normal to the direction of travel. Alternatively an air pressure system may be employed for this purpose. These pressure elements serve, moreover, to provide continuous pressure to the material, where after switching off the current at some convenient point, as the material travels through the conveyer, a cooling period is required to allow the material to return to a solidified state. The length, shape and speed of the belts, as well as the relative periods of the heating and cooling cycles will of course depend on the nature of the desired operation, as well as on the amplitude of high-frequency power available.

While in the embodiment of Fig. 1 there has been shown two movable electrodes, inasmuch as only one electrode need contain the desired seal pattern, the other electrode may be in the form of a stationary plate. Thus in the embodiment shown in Fig. 3, in lieu of band electrode 19 in Fig. 1, there is provided a stationary electrode 26 in the form of a platen or apron disposed inside of belt 11 and bearing thereagainst.

In the event a linear seal is desired, rather than a zig-zag pattern or any other non-linear form, the upper electrode may also be stationary. Thus as shown in Fig. 3, a fixed electrode 27 is positioned inside belt 10, the belts in this instance being without electrode bands. As a further modification, to obviate the need for interrupting the electrical current flow to allow for cooling under pressure, a pair of pressure elements 28 and 29 are provided externally with respect to the conveyer, these elements having tapered extensions in the contour of the pulleys whereby they may be introduced directly adjacent the rear pulleys to serve as cooling squeezers. To convey the material through the squeezer, rollers 30 and 31 are provided, the rollers being coupled to the motor 16 for rotation in the same direction as pulleys 13 and 15, respectively.

To overcome the need for an external cooling squeezer, pressure electrodes may be designed to afford a heating period for a portion of their length and a cooling period for the remaining portion thereof. Thus in the embodiment shown in Fig. 4, the upper electrode structure is constituted by a first section 32 of metal, and a second and non-metallic section 33. The electrode structure is spring mounted and bears against the belt 10. The lower electrode 34 is similar in design to electrode 26 in Fig. 3. Hence as the material passes between the electrodes, it is subjected to an electrostatic field in the region between electrode sections 32 and 34, while in the region between electrode sections 33 and 34 it is subjected solely to pressure. It is evident therefore that the electrode structure effects both heating and cooling without the need for switching off the generator current nor for external squeezing means. It is important to note that the relative lengths of the metallic and non-metallic sections 32 and 33 will depend on the speed with which the material is conveyed, the thickness and nature of the material, as well as the amplitude of the high-frequency field.

In the event it is desired to impart a non-linear seal with an electrode arrangement of the general type illustrated by Fig. 4, the fixed conductive section 32 of the upper electrode structure may be replaced by a relatively small movable endless belt mounted on a pair of rollers disposed intermediate rollers 12 and 13. The small belt may be similar in design to belt 10 provided with a conductive band 18, as shown in Fig. 2, thereby producing a desired non-linear pattern. Instead of a separate pair of rollers for the small belt, roller 12 may be common both to the belt 10 and the small belt so that a total of five rollers are entailed, rather than six rollers. A non-conductive cooling section, corresponding to section 33 in Fig. 4, may be mounted adjacent the small roller, whereby as the article being sealed passes through the conveyer, it is first heated to form a non-linear seal in accordance with the pattern on the band carried by the small belt, and then compressed and solidified under the non-conductive section.

While there has been shown what is considered at present to be preferred embodiments of the invention, it is evident that many other modifications are possible. It is intended, therefore, in the appended claims to cover all such modifications as fall within the true spirit and scope of the invention.

What is claimed is:
1. Dielectric heating apparatus comprising a pair of coacting endless belts formed of a material non-responsive to a high-frequency field, said belts being arranged to move linearly with the flat surfaces thereof extending linearly relative to each other, a first electrode structure disposed within one of said belts and bearing thereagainst, said first structure being provided with a metallic section and a non-metallic section, a second and metallic electrode structure disposed within the other of said belts and bearing against said belt, said second structure having a dimension in the direction of movement of said belts which is substantially equal to the total dimension in the same direction of said metallic and non-metallic sections of said first structure to define with said first structure a heating region between said metallic section and the corresponding portion of said second structure and a cooling region between said non-metallic section and the corresponding portion of said second structure, and means to impress a high-frequency electric voltage between said metallic sections of said first electrode and the second electrode to establish an electric field between said electrodes extending through said belts.

2. Apparatus as set forth in claim 1 further including spring means to urge said first electrode structure against the belt.

3. Dielectric heating apparatus comprising a pair of coacting endless belts for conveying an article to be sealed, a pair of pulleys disposed at either end of each belt for effecting movement thereof, means for driving each pair of pulleys in opposing directions, said belts being arranged to move linearly with the flat surfaces thereof extending linearly with respect to each other, a first electrode structure constituted by a conductive section and a non-conductive section, said first structure being resiliently mounted within one of said belts, a second electrode structure fixedly mounted within the other of said belts, said second structure having a dimension in the direction of movement of said belts which is substantially equal to the total dimension in the same direction of said metallic and non-metallic sections of said first structure to define with the first structure a heating region between said metallic section and the corresponding portion of said second structure and a cooling region between said non-metallic section and the corresponding portion of said second structure, and a high-frequency generator coupled to said electrodes to establish an electric field therebetween extending through said belts.

4. Apparatus as set forth in claim 3 wherein said first section is constituted by an auxiliary movable belt having a conductive band thereon.

References Cited in the file of this patent

UNITED STATES PATENTS

| Number | Name | Date |
| --- | --- | --- |
| 2,423,902 | Peterson | July 15, 1947 |
| 2,439,918 | Auxier et al. | Apr. 20, 1948 |
| 2,460,566 | Brown et al. | Feb. 1, 1949 |
| 2,463,289 | Leguillon | Mar. 1, 1949 |
| 2,476,282 | Castellan | July 19, 1949 |
| 2,491,687 | Nutt | Dec. 20, 1949 |
| 2,575,251 | Arnold | Nov. 13, 1951 |
| 2,576,519 | Kopp | Nov. 27, 1951 |
| 2,614,953 | Anglada | Oct. 21, 1952 |